J. F. IVERSON.
BEET PLOW.
APPLICATION FILED MAY 20, 1914.
1,161,215.
Patented Nov. 23, 1915.
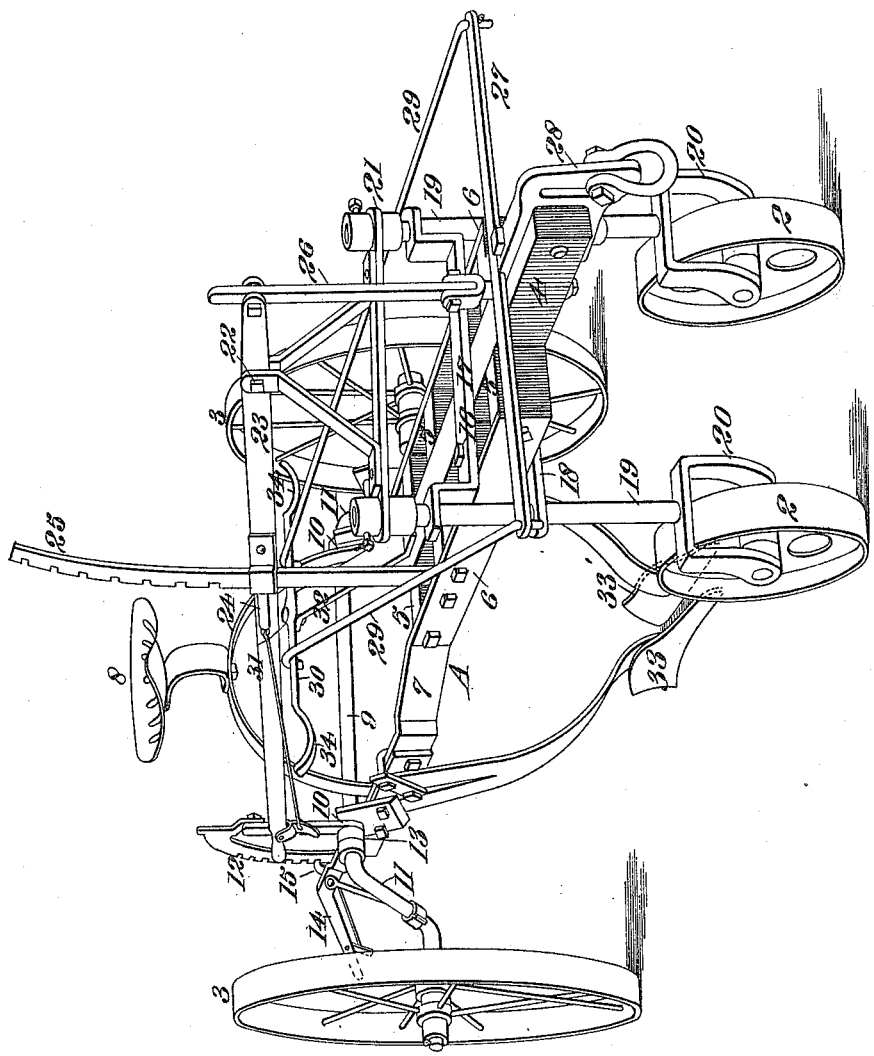
WITNESSES:
Charles Pickles
Thos Lashley
INVENTOR
John F. Iverson
BY G. H. Strong
ATTORNEY
COLUMBIA PLANOGRAPH CO., WASHINGTON, D. C.

UNITED STATES PATENT OFFICE.

JOHN F. IVERSON, OF SALINAS, CALIFORNIA.

BEET-PLOW.

1,161,215.  Specification of Letters Patent.  Patented Nov. 23, 1915.

Application filed May 20, 1914. Serial No. 839,736.

*To all whom it may concern:*

Be it known that I, JOHN F. IVERSON, a citizen of the United States, residing at Salinas, in the county of Monterey and State of California, have invented new and useful Improvements in Beet-Plows, of which the following is a specification.

This invention relates to a beet plow.

It is one of the objects of the present invention to provide a simple, substantial, cheaply manufactured plow, especially designed for digging beets, and which may be quickly adjusted and easily handled; and the main object of the invention is to provide a novel means for raising and lowering the plow-carrying frame with relation to the supporting wheels, thus permitting the plows to be adjusted to cut deep or shallow as circumstances may require.

Further objects will hereinafter appear.

The invention consists of the parts and the construction and combination of parts as hereinafter more fully described and claimed, having reference to the accompanying drawing, in which the figure is a perspective of the invention.

Referring to the drawings, A indicates the main frame of the plow, which is carried by front and rear wheels 2 and 3 respectively. The frame is here shown as consisting of a central beam 4, to which is secured in spaced relation, by cross-bars 5, a pair of beams 6, the rear ends of which are slightly expanded, as at 7, to form a support for a riding seat 8 and rear axle 9. The rear axle is loosely journaled in the frame, as at 10, and is provided with crank-like extensions 11, upon the outer ends of which the rear wheels 3 are journaled.

Suitably secured to one side of the rear frame extension is a stationary, semicircular rack bar 12, and secured to the rear axle 10, as at 13, is a lever 14, provided with a spring-actuated pawl 15 which is adapted to interlock with the semicircular rack bar 12. The pawl 15 is operated by a handle and link in the usual manner. This rear lifting attachment comprising the construction of the rear axle upon which the wheels 3 are mounted, together with the provision of the lever 14 with connected rack bar 12, permits the axle to be turned with relation to the frame, and consequently raises and lowers the frame with relation to said wheels.

Suitably secured to the front end of the frame, as at 16, is an offset cross-bar 17, and similarly secured to the lower side of the frame, just below the cross-bar 17, is a secondary bar 18. Extending through said bars, on each side of the frame, is a pair of vertically disposed rods 19, the lower ends of which are fork-shaped, as at 20, to form journals for the front wheels 2. Connecting the upper ends of said rods is a cross-bar 21, and pivotally connected at 22 to an inverted V-shaped upright mounted on said bar, is a lever 23, one end of which is provided with a pawl 24 and an operating grip, said pawl being adapted to interlock with a semicircular rack bar 25 and having a housing which slidably receives and is carried by the latter. Connecting the outer end of said lever with the front end of the frame is a link 26. The provision of the lever 23, in connection with link 26, provides a front lifting attachment and means by which the rods 19, with connected cross-bar 21, may be raised or lowered with relation to the frame A; or, in other words, provides a means whereby the front end of the frame may be raised or lowered with relation to the front wheels 2. Both of these attachments are within the ready control of the operator on the seat 8.

The steering of the beet plow is accomplished in this instance by mounting a cross arm 27 on the inner end of a clevis indicated at 28, and connecting the outer ends of said arms, by means of rod links 29, with a foot-actuated steering bar 30, pivotally mounted, as at 31, upon a slightly elevated extension bar 32 secured on the center post of the frame. A machine constructed and arranged in the manner here shown can be easily handled as the levers 14 and 23, by which the adjustment of the frame, with connected plows 33 and 33', is accomplished, are sufficiently long to make this adjustment easy. The steering and handling of the plow is otherwise accomplished directly from the riding seat, as the operator will only have to swing the steering bar 30 by means of foot extensions 34 formed thereon.

The wheels 2 are in this instance trailer wheels, although they are mounted on the forward end of the plow-supporting frame. The rods 19 are so mounted that they may turn freely in any direction both in bar 21 and the guide bars 17 and 18. This permits the wheels 2 to act as trailers which will consequently follow the line of pull as this is changed by swinging the clevis arms from one side to the other.

The materials and finish of the several parts of the beet plow are such as the experience and judgment of the manufacturer may dictate.

I also wish it understood that various changes in form, proportions and minor details of construction may be resorted to within the scope of the appended claim and that I do not wish to limit myself to the specific design and construction here shown.

Having thus described my invention, what I claim and desire to secure by Letters Patent is—

In combination with a frame having wheels at its rear, a support for the front end of the frame comprising a pair of wheeled vertical standards, a connection between said standards, a lower cross-bar secured to the frame on its under face, an upper cross-bar secured to the frame on its top face and having its ends offset upwardly, the ends of said cross-bars having alined apertures in which said standards slide, an inverted V-shaped upright on said connection between the standards, a lever pivoted between its ends to said upright, an arc-shaped rack bar secured at its lower end to the frame, a pawl having a housing which latter slidably receives the rack bar and is carried by the lever, means to operate the pawl, and a link pivoted to the front end of the frame and to the front end of said lever.

In testimony whereof I have hereunto set my hand in the presence of two subscribing witnesses.

JOHN F. IVERSON.

Witnesses:
JOHN H. HERRING,
W. W. HEALEY.

Copies of this patent may be obtained for five cents each, by addressing the "Commissioner of Patents, Washington, D. C."